March 23, 1965 G. R. S. STOW 3,174,562
AUGER BORING MACHINE
Filed Aug. 20, 1962
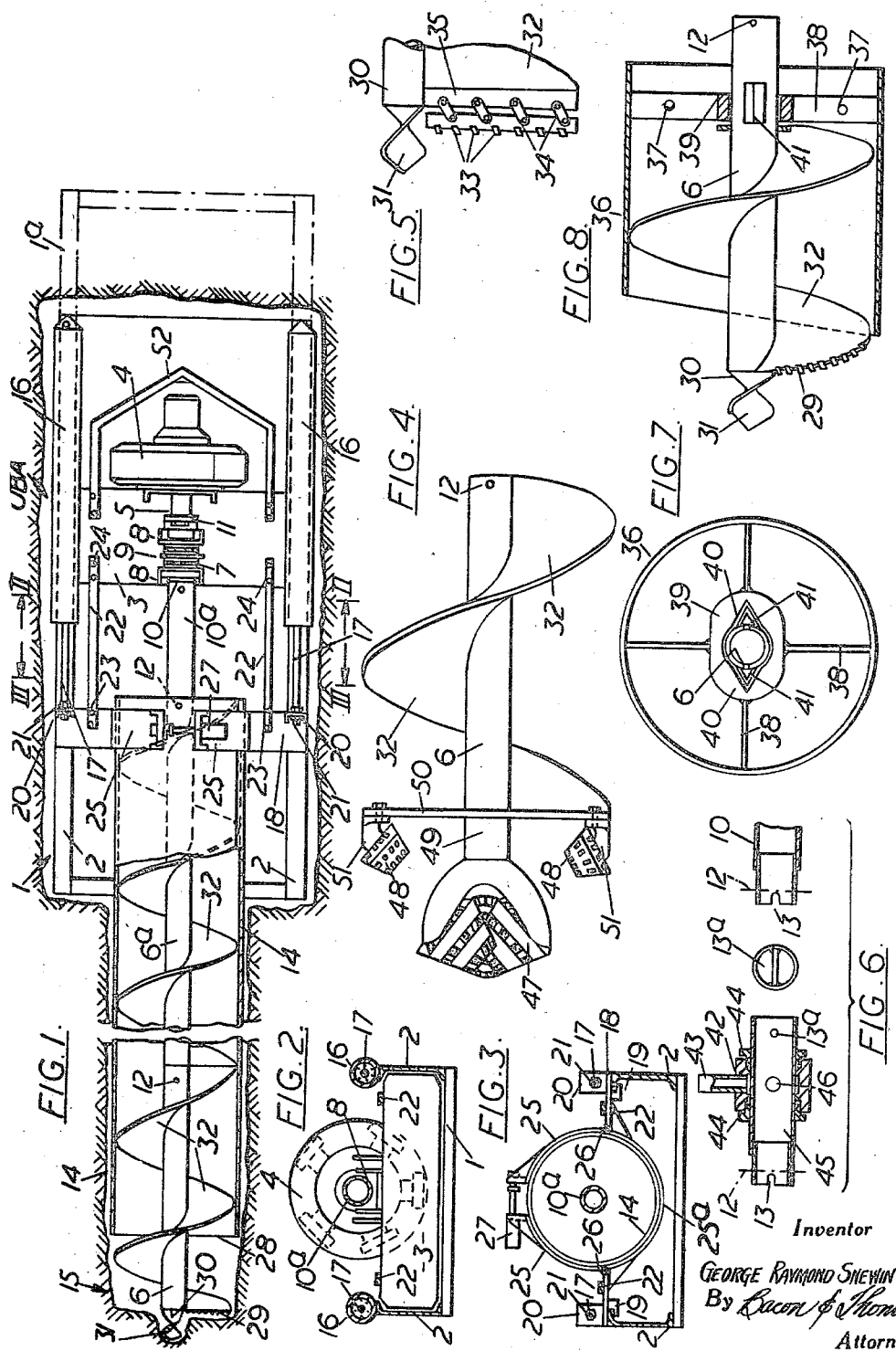
Inventor
GEORGE RAYMOND SHEWIN STOW
By Bacon & Thomas
Attorneys

United States Patent Office 3,174,562
Patented Mar. 23, 1965

3,174,562
AUGER BORING MACHINE
George Raymond Snewin Stow, Henley-on-Thames, England, assignor to George Stow & Co. Limited, Henley-on-Thames, England, a British company
Filed Aug. 20, 1962, Ser. No. 217,815
Claims priority, application Great Britain, Apr. 30, 1962, 8,795/62
9 Claims. (Cl. 175—122)

This invention is concerned with improvements in or relating to strata boring apparatus of the type in which a rotary auger or like tool is used.

There are a number of auger boring machines which are used only for boring substantially horizontal conduits beneath roads, through banks, or wherever required. These known machines are of relatively massive construction and incorporate a prime mover which drives through a reduction gear to rotate the auger, and power operated means which abut against the end of a length of tube to push it into a bore being made so as to support the sides.

It is an object of this invention to provide an improved boring apparatus of the type using a rotary auger, which is more versatile than known machines in that it can readily be used for boring horizontal, inclined or vertical holes and which is of more compact construction than known machines so as to facilitate operations in confined spaces.

According to the invention there is provided a boring apparatus comprising a main frame having a tool carriage and a bore lining tube carriage longitudinally movably mounted therein, detachable means for coupling said carriages together for movement in unison, and hydraulically operable feed means carried by said frame and connected to one of said carriages for moving such carriage in a tool feeding or tool retracting direction, said tool carriage having an electric or fluid pressure actuated motor to rotate a tool.

Boring apparatus as above set forth is particularly well suited for horizontal, vertical or inclined operations since, as a result of the provision of hydraulic feed means for moving either one carriage alone, or both carriages when the coupling means are connected, and an electric or fluid pressure actuated motor for rotating the tool, the prime mover or power source for the drive means and motor can be remote from the working site which enables the apparatus to be both compact and easily maneuverable. Thus the frame can readily be mounted vertically or supported at an angle to the vertical, when working is required in other than a horizontal direction.

The provision of two carriages which can be coupled together again provides several advantages in the operation of the apparatus. Thus when using the apparatus for boring substantially horizontal holes, it is usual for the spoil to be withdrawn by an extension shaft on the auger, and the provision of two spaced carriages in the frame, provides a convenient space between the carriages from which the spoil can be removed if desired by means of a removable spoil tray disposed in the frame.

Where vertical or steeply inclined bores are to be made, as for instance in boring wells or in sinking caissons or piles, the apparatus according to the invention will be mounted by its frame, and where say rock is encountered, the provision of the two carriages enables an increased load to be applied to the auger by coupling the two carriages together and feeding the lining tube carriage in a tool feeding direction. In vertical boring operations it is usual for spoil to be removed from the bore by removing the whole tool with the spoil. Where soft or sandy soil is being worked, the provision of two carriages again makes it possible to bore and at the same time drive a lining tube into the bore with the carriages coupled, whereupon the carriages can be uncoupled enabling the tool and its carriage to be withdrawn with the spoil while the bore lining tube carriage remains in position for the continuation of the boring operation.

While it is preferred to mount hydraulic feeding rams between the main frame and the bore lining tube carriage so as to feed that carriage alone, or both carriages in unison, this arrangement is not essential. Thus, such hydraulic rams may be connected between the forward end of the main frame and the tool carriage so as to draw the tool carriage, and the lining tube carriage when coupled thereto, towards the forward end of the main frame. Again, if desired, telescopically constructed hydraulic rams may be connected between the rearward end of the main frame and the tool carriage so as to push that carriage and, if desired, the lining carriage as well, towards the forward end of the main frame and thus in a tool feeding direction.

The bore tube lining carriage is preferably provided with means serving to grip a lining tube positively so that such tube can be either fed into or withdrawn from a bore depending upon the direction of movement of the carriage under the influence of its hydraulic drive means.

While various forms of positive gripping means for the tubes may be employed, e.g. so as to grip the end of the tube, it is particularly preferred to provide gripping means in the form of clamps serving to embrace a lining tube on its outside surface. Such an arrangement not only enables a very secure hold to be obtained on the tube which can be withdrawn, for instance as a concrete pile is cast into the bore, but also enables adjustments to be made very readily as between the cutting face of the tool and the leading edge of the lining tube. Again the provision of circumferential clamps is of advantage since such clamps will be disposed within the axial length of the tube and thus do not add to the overall length of the apparatus.

Any suitable means may be provided for opening and closing the clamps. Thus, hydraulic or screw actuated means may be provided for this purpose. Where tubes of different sizes are to be used, shims or liners may be provided for the clamps to accommodate such other tubes.

It will be appreciated that, in use of the apparatus, an auger or like tool, with or without spoil removing fluting, and, where desired, a bore lining tube will be mounted in their respective carriages with the tool extending into and through the tube. As work proceeds extension shafts and extension lining tubes will be introduced. The tool shaft and extension shafts can be coupled to each other and to the drive shaft of the motor on the tool carriage, for example by pins or by claw couplings where horizontal holes are being bored. Where, however, vertical or inclined holes are being formed, flanged couplings which can be readily bolted together may be provided.

In order that the invention may be well understood, one preferred embodiment, by way of example only, of a strata boring apparatus according to the invention, together with certain modifications, will be described in further detail with reference to the accompanying drawings in which:

FIGURE 1 is a plan view of the boring apparatus shown in operating position in a boring, FIGURE 2 is a section on the line II—II of FIGURE 1, FIGURE 3 is a section on the line III—III of FIGURE 1, FIGURE 4 is a detail of a roller rock cutter in front of an auger, FIGURE 5 is a detail of an expanding auger tool blade, FIGURE 6 is a detail of a muff liquid or air supply connection in the coupling between the drive shaft from the hydraulic motor and a tubular auger tool shaft or its extension, and FIGURES 7 and 8 show an end view and axial section, respectively, of a spoil containing shroud for the auger tool.

The apparatus—generally identified as UBA—comprises a rigid frame 1 of channel shape cross section (see FIGURES 2 and 3) the sides of which are constituted as rails 2 for a tool carriage 3 which can thus slide longitudinally along the length of the frame in either direction. On the carriage is mounted a motor 4 which may be an electric, hydraulic or compressed air motor. The motor 4 has an output drive shaft 5 which is connected to a tool shaft 6 (or tool shaft extension shaft 6a) by coupling means comprising thrust bearings 7 acting between brackets 8 fixed to the carriage, said thrust bearings being disposed on either side of a collar 9 which is secured to an intermediate shaft 10 connected to the motor shaft 5 by a disc coupling 11. The brackets 8 in addition to taking the load of the thrust bearings, also provide a journal for the intermediate shaft 10 which is connected through a second intermediate shaft 10a to the auger tool shaft 6 (6a) by a steel bolt 12 passing through an internal sleeve (not shown) between the shafts 6 and 10, and by a claw coupling 13 and pin 13a (see FIGURE 6) which serves to transmit torque from the motor to the tool shaft 6 (6a).

A bore lining tube carriage 18 is mounted on the frame 1 in front of tool carriage 3, the carriage 18 being restrained by guides 19 to only longitudinal movements with respect to frame 1. Coupling means in the form of links 22 detachably connected to carriages 3 and 18 by studs 24 and 23 enable the two carriages to be interconnected for movement in unison.

Cylinders 16 mounted on either side of the frame 1 are provided with hydraulically actuated double acting pistons having rods 17 which are connected to brackets 20 on carriage 18 by nuts 21.

Thus when the links 22 connect the carriages 3 and 18 together both carriages can be advanced or retracted in response to the movement of piston rods 17. No supply of hydraulic power to cylinders 16 is shown but it will be appreciated that this can readily be provided from any point remote from the scene of operation.

Carriage 18 is provided with clamps which serve positively to grip a bore lining tube section 14 which is to be fed into the bore. Carriage 18 has two clamp sections 25, each hingedly connected at 26, below the center line of the tube 14 to the ends of a clamping member 25a fixed on carriage 18. A hydraulic or screw securing device 27 serves to tighten or loosen the clamp section 25 as required.

As will be seen from FIGURES 1 to 3 a bore lining tube section 14 is circumferentially and positively gripped by clamps 25, 25a so that, depending upon whether the coupling links 22 are connected or not, the tube 14 can be pushed into the bore together with the forward boring movement of the tool or independently thereof. It will furthermore be noted that the provision of the clamps circumferentially of the tube 14 leaves a space between the carriages 3 and 18 from which spoil can be withdrawn.

Since the tube 14 is positively gripped by the clamps 25, 25a it will be apparent that, by appropriate movement of carriage 18, the tube 14 can be fed into or withdrawn from the bore. Furthermore, when it is desired to adjust the relative position of the leading edge of tube 14 with respect to the cutting face 29 of tool head 30, this can be easily effected upon release of the clamps. It is often desirable when working in loose sand to arrange for the tube 14 to be in advance of the tool.

When substantially horizontal holes are to be bored the operation of the apparatus will be as shown in FIGURE 1. Frame 1 is disposed in the ground where the bore is to be made and is firmly secured in position by any suitable baulks (not shown).

Coupling links 22 connect the carriages 3 and 18 together so that when hydraulic power is applied to cylinders 16 the tube carriage and the tool advance together, the tool being of course separately rotated by motor 4. If, as shown, lining tubes are to be inserted in the boring, a lining tube section 14 is gripped by the clamps 25 and fed with the auger 30. The stroke of the hydraulic pistons 17 is slightly greater than the length of the auger shaft section 6 or 6a—which length itself corresponds to the lengths of the lining tube sections to be used—so that after boring one length the coupling pin 12 through shaft 10a is removed, the clamps 25 are released, and both carriages are retracted together to enable an additional length of lining tube 14 and auger shaft 6a to be inserted.

The connection of additional lengths of extension shafts 6a can be simply achieved by a hardened steel bolt 12 and interengaging claw members 13 and cross pins 13a at the respective ends of the shafts. A detailed view of such interconnection is shown in FIGURE 6.

As regards additional lengths of lining tube 14, these can be screwed to a preceding tube or welded thereto on site if so desired.

The auger boring tool head 30 may have a pointed twisted tip 31 and behind the cutting face 29 a turn or turns of fluting 32 for clearing spoil away from the cutting face. When the equipment is to be used in a horizontal position, as shown in FIGURE 1, the tool shaft extensions 6a are also provided with spoil removal flutings 32 so that the spoil can be removed—by rotation of the tool—from the cutting face 29 to the mouth of the hole 15 at which the drilling unit UBA is positioned as shown.

The equipment can be used with or without the bore lining tubes 14; when required for lining tubes, the auger tools may be made expandable to drill to a sufficient size to clear the tube. Thus, as indicated in FIGURE 5, the tool head 30 may have a cutting face constituted by cutting tines 33 mounted upon a radial bar in acutely inclined position outwardly, the bar being connected by links 34 to a fixed radial bar 35 to provide a parallel motion arrangement by which the tine bar 34 moves radially, with a parallel motion, outwards as the tool head is displaced axially in the feed direction, and inwardly as the tool is retracted.

Where the apparatus is to be used to drill through hard rock, roller rock cutters will be required and FIGURE 4 shows a suitable tool for this purpose. Shaft 6 which has flutes 32 thereon is coupled to intermediate shaft 10a by bolt 12. At the end of the shaft 6 there is a standard tool joint 49 which carries a toothed roller rock bit 47 and a cross arm 50 on which cone assemblies 48 are mounted by bolted fittings 51. If such a rock cutter tool is to be used for vertical drilling the cuttings may be removed from the hole in the following ways, and in each case using tubular shaft sections 6, 6a, and a tubular muff 42 which is shown in FIGURE 6 and described below. In one method fluid is pumped through the shaft into the hole at a velocity high enough to cause the cuttings to be washed or blown out of the hole. If desired the flutes 32 can be replaced by a known chip cup in which the cuttings will settle out for subsequent removal. Standard roller rock bits, such as 47, are conventionally provided with fluid passageways leading from the hollow shaft 6 to the front of the bit.

In a third method liquid is, if necessary, introduced into the hole and then pumped out with the cuttings through the hollow shaft 6, 6a.

FIGURE 6 shows a modification of the apparatus which enables air, water or mud to be supplied to the tool during boring or filling operations. The shafts 6, 6a of the tool which will be tubular are connected to the shaft 5 of the motor 4 and intermediate shaft 10 by the coupling shown in FIGURE 6 in place of the second intermediate shaft 10a of FIGURE 1. This coupling comprises a tubular shaft 45 having a pin 13a within one end and a claw 13 at the other. Pin 13a serves to engage a claw coupling 13 on shaft 10 while the claw 13 at the other end of shaft 45 engages a pin within the end of a length of tool shaft 6 or 6a. Locking pins 12 are inserted at each end of the tubular shaft 45 to secure the coupling in position.

A tubular muff 42, having an inlet pipe 43 for fluid, surrounds the tubular shaft 45 and is provided with fluid seals 44 at each end. A port 46 is formed in the shaft 45 so that fluid entering the muff 42 via pipe 43 can pass down shaft 45 and via the tubular tool shaft to the working face of the tool 47.

When the apparatus according to the invention is to be used for vertical or steeply inclined operations it will be attached to say a crane, drill rig or other frame. Since in vertical operations it is not practicable to remove spoil by means of fluting 32 it is usual to withdraw the tool from the boring and thus withdraw the spoil as well. For this purpose the rigid base framework 1 may be extended as indicated by the dotted lines 1a so that the tool can be raised clear of the boring to remove the spoil without disconnecting any extension shaft 6a. For drilling—in such circumstances—holes deeper than the extended frame 1, 1a, certain extension shafts 6a may be disconnected to enable the tool to be withdrawn to the surface to remove the spoil.

The apparatus according to the invention can be used in various ways for vertical operation, depending upon the nature of the work. Thus, where relatively soft earth is to be bored, the tool rotated by its motor 4 can be lowered from a crane or other structure via loop 52 on carriage 3, the coupling links 22 being disconnected and the carriage 18 therefore remaining stationary.

Where, however, lining tubes are required in the bore these can be fed in, as the boring proceeds by operating the hydraulic feed means 16, 17 and thus feeding carriage 18 independently of the tool and with the coupling straps 22 disconnected.

If, for instance, a concrete pile is being cast in situ into a previously bored and lined hole, carriage 18 and clamps 25, 25a can engage the lining tube which by a retracting movement of carriage 18 via hydraulic drive means 16, 17, can be withdrawn as the concrete is poured.

Again where rock drilling is undertaken an increased thrust can be applied to the tool by securing frame 2 to a suitable fixed structure and connecting the carriages 3 and 18 together and applying a forward or downward movement to carriage 18 and thus carriage 3 via the hydraulic feed means 16, 17.

As a further useful feature for vertical operation the apparatus may also include a spoil containing shroud 36 (FIGURES 7 and 8) which embraces the tool and is axially displaceable on the shaft 6 so that after the tool and shroud are lifted out of the bored hole the spoil retained within the shroud and resting on flutes 32 can be removed merely by axially withdrawing the shroud away from the tool head by means of a lifting appliance (not shown) and which may be attached to the shroud by the use of lifting holes 37 provided in the top thereof. The method of providing for the required displacement of the shroud may vary depending on the working conditions. For example, the shroud may be carried on a spider 38 which has a hub 39 with diametrically opposed guides 40 of triangular cross section, which slide on axially directed ribs 41 on shaft 6. The shroud can then slide but not rotate relative to shaft 6.

It will be seen that there has been provided a very versatile strata boring apparatus which is of compact form and which can be used for a wide range of boring or drilling operations in a horizontal, inclined or vertical direction.

I claim:

1. A boring apparatus comprising: a main frame; a tool carriage mounted on said frame for longitudinal movement thereon; a bore lining tube carriage mounted on said frame for longitudinal movement thereon, independently of said tool carriage; means for releasably coupling said carriages together for movement in unison along said frame; hydraulically operable feed means on said frame and connected to one of said carriages for moving the same longitudinally thereon; a drive motor on said tool carriage for rotating a tool thereon; and holding means on said bore lining tube carriage for holding a bore lining tube thereto.

2. Apparatus as defined in claim 1 wherein said feed means is connected to said bore lining tube carriage.

3. Apparatus as defined in claim 1 wherein said holding means comprises at least one arcuate clamp member hingedly connected to said lining tube carriage and adapted to embrace and grip the outer surface of a bore lining tube.

4. Apparatus as defined in claim 1 wherein said feed means comprises a double-acting hydraulic piston and cylinder on each side of said frame and each being connected to said bore lining tube carriage; said means for releasably coupling said carriages comprises a pair of links and means for connecting each of said links to both said carriages on respectively opposite sides thereof.

5. Apparatus as defined in claim 1 wherein said tool carriage is provided with a thrust bearing assembly thereon; torque transmitting means journalled by said thrust bearing assembly and drivingly connected to said motor; said torque transmitting means including means for releasably coupling it to an auger shaft.

6. Apparatus as defined in claim 1 including a tubular shaft drivingly connected to said motor and journalled in a muff nonrotatably mounted on said tool carriage; fluid inlet means on said muff and said shaft having a port in communication with said muff whereby a stream of fluid may flow through said inlet means, muff and tubular shaft.

7. Apparatus as defined in claim 1 including a rotary auger drivingly connected to said motor, said auger having cutting tines mounted on a radial bar pivotally linked to the auger for parallel radial motion thereon.

8. Apparatus as defined in claim 1 including a rotary boring tool drivingly connected to said motor; a spoil retaining shroud surrounding said boring tool; and means supporting said shroud on said boring tool for longitudinal movement thereon but holding the shroud against rotation on said tool.

9. Apparatus as defined in claim 1 including a rotary boring tool drivingly connected to said motor and comprising an auger having a central roller rock bit at its forward end and roller rock bits on said forward end radially outward of said central bit.

References Cited by the Examiner

UNITED STATES PATENTS

| | | | |
|---|---|---|---|
| 1,100,204 | 6/14 | Stewart | 175—171 X |
| 1,993,366 | 3/35 | Englebright | 175—122 |
| 2,294,318 | 8/42 | Rich | 175—203 X |
| 2,588,068 | 3/52 | Williams et al. | 175—62 X |
| 2,979,143 | 4/61 | Kandle | 175—171 X |
| 3,073,124 | 1/63 | Nadal | 175—171 X |
| 3,106,257 | 10/63 | Helm | 173—152 X |
| 3,107,738 | 10/63 | Osborn | 175—62 |
| 3,107,741 | 10/63 | Adams et al. | 175—122 |

CHARLES E. O'CONNELL, *Primary Examiner.*